US012693803B2

(12) United States Patent　　　　(10) Patent No.:　　US 12,693,803 B2
　　Oh et al.　　　　　　　　　　　　　(45) Date of Patent:　　　　Jul. 28, 2026

(54) MEMORY DEVICE, OPERATING METHOD OF MEMORY DEVICE AND MEMORY SYSTEM INCLUDING A FIRST SUBBLOCK CONFIGURED TO PERFORM OPERATIONS INDEPENDENTLY OF A SECOND SUBBLOCK

(71) Applicant: Samsung Electronics Co., Ltd., Suwon-si (KR)

(72) Inventors: Eun Chu Oh, Suwon-si (KR); Beomkyu Shin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/595,769

(22) Filed: Mar. 5, 2024

(65) Prior Publication Data

US 2024/0311054 A1　　Sep. 19, 2024

(30) Foreign Application Priority Data

Mar. 13, 2023　　(KR) ........................ 10-2023-0032615

(51) Int. Cl.
*G06F 3/06*　　　　　(2006.01)
(52) U.S. Cl.
CPC .......... *G06F 3/0659* (2013.01); *G06F 3/0613* (2013.01); *G06F 3/064* (2013.01); *G06F 3/0652* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 7,610,437 | B2 * | 10/2009 | Sinclair | ................. G06F 3/0652 |
| | | | | 711/104 |
| 7,984,084 | B2 * | 7/2011 | Sinclair | ............... G06F 16/1847 |
| | | | | 707/818 |
| 8,203,882 | B2 | 6/2012 | Hishida et al. | |
| 8,285,918 | B2 * | 10/2012 | Maheshwari | ........ G11C 7/1072 |
| | | | | 711/159 |

(Continued)

FOREIGN PATENT DOCUMENTS

WO　　WO-2020083106 A1 *　4/2020　　........... G06F 3/0607

OTHER PUBLICATIONS

Kingston Technology, "What is NAND?", May 2021, pp. 1-7, https://www.kingston.com/en/blog/pc-performance/difference-between-slc-mlc-tlc-3d-nand (Year: 2021).*

*Primary Examiner* — Christopher D Birkhimer
(74) *Attorney, Agent, or Firm* — HARNESS, DICKEY & PIERCE, P.L.C.

(57)　　　　ABSTRACT

Provided is a memory device including a plurality of memory blocks including of at least one subblock, wherein the memory block includes a first subblock configured to store first data including of at least one bit, and a second subblock configured to perform an erase operation independently of the first subblock and store second data including of at least one bit. The memory device is configured to perform a read operation on the second data in response to a write operation being performed on the second data in the second subblock. The memory device is configured to perform a write operation on the first data in the first subblock in response to a read operation being performed on the second data in the second subblock.

20 Claims, 14 Drawing Sheets

(56) References Cited

U.S. PATENT DOCUMENTS

| | | | | |
|---|---|---|---|---|
| 8,429,359 | B1* | 4/2013 | Desai | G06F 11/1461 |
| | | | | 711/E12.103 |
| 8,443,263 | B2* | 5/2013 | Selinger | G06F 11/1068 |
| | | | | 714/768 |
| 8,538,919 | B1* | 9/2013 | Nielsen | H04L 63/0272 |
| | | | | 718/1 |
| 8,593,678 | B2* | 11/2013 | Ohishi | H04N 1/2166 |
| | | | | 358/1.15 |
| 8,873,284 | B2* | 10/2014 | Sinclair | G06F 12/0246 |
| | | | | 365/185.11 |
| 8,964,481 | B2 | 2/2015 | Oh et al. | |
| 9,075,705 | B2* | 7/2015 | Hikichi | G06F 11/004 |
| 9,092,182 | B2* | 7/2015 | Ohishi | H04N 1/00944 |
| 9,223,693 | B2* | 12/2015 | Sinclair | G06F 12/0246 |
| 9,336,133 | B2* | 5/2016 | Sinclair | G06F 12/0246 |
| 9,344,596 | B2* | 5/2016 | Ohishi | H04N 1/00973 |
| 9,348,746 | B2* | 5/2016 | Sinclair | G06F 12/0246 |
| 9,465,731 | B2* | 10/2016 | Sinclair | G06F 12/0246 |
| 9,620,201 | B1 | 4/2017 | Lai et al. | |
| 9,652,382 | B1* | 5/2017 | Subramanian | G06F 12/0253 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 9,800,291 | B1* | 10/2017 | Ben David | G06F 11/1415 |
| 9,886,219 | B2 | 2/2018 | Jang et al. | |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,430,279 | B1* | 10/2019 | Dittia | G06F 3/0656 |
| 10,503,611 | B1* | 12/2019 | Srivastav | G06F 11/1076 |
| 10,739,996 | B1* | 8/2020 | Ebsen | G06F 16/1727 |
| 10,795,812 | B1* | 10/2020 | Duggal | G06F 3/067 |
| 10,983,715 | B2* | 4/2021 | Sharoni | G06F 21/79 |
| 11,086,537 | B2* | 8/2021 | Byun | G06F 12/0253 |
| 11,237,732 | B2 | 2/2022 | Natarajan et al. | |
| 11,704,043 | B1* | 7/2023 | Throgmorton | G06F 11/1469 |
| | | | | 711/162 |
| 11,842,085 | B1* | 12/2023 | Sreekanthan | G06F 3/064 |
| 2004/0117414 | A1* | 6/2004 | Braun | G06F 8/65 |
| 2006/0005074 | A1* | 1/2006 | Yanai | G06F 3/064 |
| | | | | 714/6.32 |
| 2007/0033325 | A1* | 2/2007 | Sinclair | G06F 3/0608 |
| | | | | 711/170 |
| 2008/0082596 | A1* | 4/2008 | Gorobets | G06F 12/0253 |
| 2008/0140902 | A1* | 6/2008 | Townsend | H04B 1/0475 |
| | | | | 710/306 |

| | | | | |
|---|---|---|---|---|
| 2008/0189477 | A1* | 8/2008 | Asano | G06F 12/0246 |
| | | | | 711/E12.008 |
| 2008/0307020 | A1* | 12/2008 | Ko | G06F 21/6245 |
| 2009/0041230 | A1* | 2/2009 | Williams | G06F 11/1448 |
| | | | | 707/999.204 |
| 2011/0145473 | A1* | 6/2011 | Maheshwari | G11C 7/1072 |
| | | | | 711/E12.008 |
| 2011/0161784 | A1* | 6/2011 | Selinger | G06F 11/1016 |
| | | | | 714/E11.002 |
| 2011/0236049 | A1* | 9/2011 | Haga | G03G 15/5004 |
| | | | | 399/75 |
| 2011/0302358 | A1* | 12/2011 | Yu | G06F 11/108 |
| | | | | 711/E12.008 |
| 2013/0024423 | A1* | 1/2013 | Doshi | G06F 11/1448 |
| | | | | 707/640 |
| 2013/0173554 | A1* | 7/2013 | Ubukata | G06F 11/2094 |
| | | | | 707/640 |
| 2014/0006688 | A1* | 1/2014 | Yu | G06F 12/0246 |
| | | | | 365/185.03 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2015/0227602 | A1* | 8/2015 | Ramu | G06F 11/1456 |
| | | | | 707/634 |
| 2016/0196216 | A1* | 7/2016 | Lee | G06F 3/0631 |
| | | | | 711/170 |
| 2016/0246713 | A1* | 8/2016 | Choi | G06F 3/0608 |
| 2017/0123655 | A1* | 5/2017 | Sinclair | G06F 3/061 |
| 2017/0132082 | A1* | 5/2017 | Resch | G06F 11/1076 |
| 2017/0132086 | A1* | 5/2017 | Blackburn | G06F 11/1466 |
| 2017/0242790 | A1* | 8/2017 | O'Krafka | G06F 3/0652 |
| 2017/0255415 | A1* | 9/2017 | Bubeyko | G06F 11/0772 |
| 2018/0136842 | A1* | 5/2018 | Kim | G06F 3/0644 |
| 2018/0189175 | A1* | 7/2018 | Ji | G06F 3/0679 |
| 2019/0339886 | A1* | 11/2019 | Devaraju | G06F 3/0604 |
| 2020/0089420 | A1* | 3/2020 | Sharoni | G06F 21/79 |
| 2020/0192794 | A1* | 6/2020 | Lee | G06F 12/0246 |
| 2020/0218653 | A1* | 7/2020 | Ryu | G06F 12/0253 |
| 2020/0272363 | A1* | 8/2020 | Sato | G06F 3/0644 |
| 2020/0310686 | A1* | 10/2020 | Truong | G06F 3/061 |
| 2021/0318820 | A1 | 10/2021 | Jin et al. | |
| 2021/0342362 | A1* | 11/2021 | Haravu | G06F 11/1464 |
| 2021/0406216 | A1* | 12/2021 | Komatsu | G06F 16/11 |
| 2022/0199164 | A1 | 6/2022 | Kim et al. | |
| 2023/0112692 | A1* | 4/2023 | Richard | G06F 3/0604 |
| | | | | 711/154 |
| 2023/0205424 | A1* | 6/2023 | Jain | G06F 3/0634 |
| | | | | 711/154 |
| 2023/0400998 | A1* | 12/2023 | Narum | G06F 3/064 |
| 2024/0134565 | A1* | 4/2024 | Gale | G11B 20/1886 |
| 2024/0153532 | A1* | 5/2024 | Miyamura | G06F 3/0661 |

* cited by examiner

FIG. 8

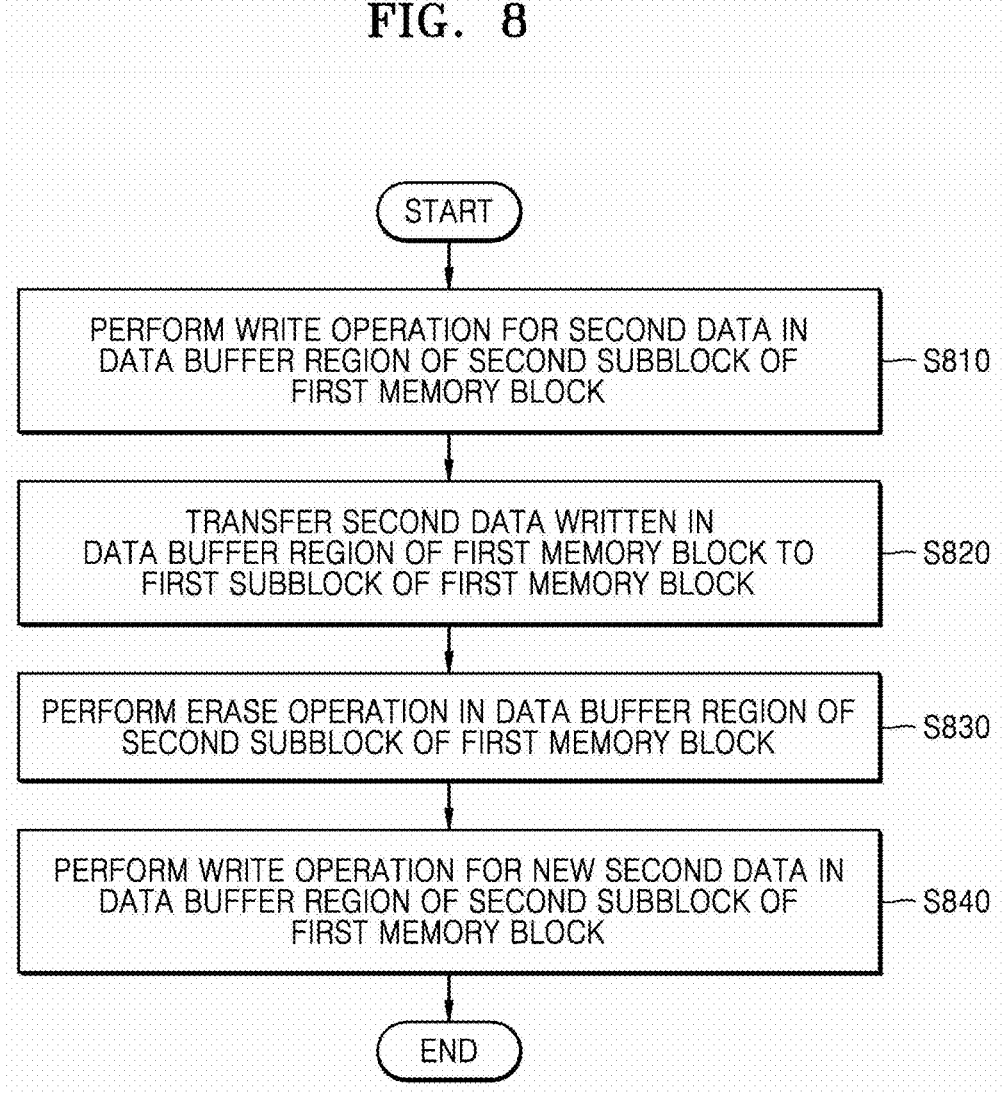

START

PERFORM WRITE OPERATION FOR SECOND DATA IN DATA BUFFER REGION OF SECOND SUBBLOCK OF FIRST MEMORY BLOCK — S810

TRANSFER SECOND DATA WRITTEN IN DATA BUFFER REGION OF FIRST MEMORY BLOCK TO FIRST SUBBLOCK OF FIRST MEMORY BLOCK — S820

PERFORM ERASE OPERATION IN DATA BUFFER REGION OF SECOND SUBBLOCK OF FIRST MEMORY BLOCK — S830

PERFORM WRITE OPERATION FOR NEW SECOND DATA IN DATA BUFFER REGION OF SECOND SUBBLOCK OF FIRST MEMORY BLOCK — S840

END

MEMORY DEVICE, OPERATING METHOD OF MEMORY DEVICE AND MEMORY SYSTEM INCLUDING A FIRST SUBBLOCK CONFIGURED TO PERFORM OPERATIONS INDEPENDENTLY OF A SECOND SUBBLOCK

CROSS-REFERENCE TO RELATED APPLICATION

This application is based on and claims priority under 35 U.S.C. § 119 to Korean Patent Application No. 10-2023-0032615, filed on Mar. 13, 2023, in the Korean Intellectual Property Office, the disclosure of which is incorporated by reference herein in its entirety.

BACKGROUND

The inventive concepts relate to memory devices, methods of operating the memory devices, and memory systems, and more particularly, to memory devices including a plurality of memory blocks composed of at least one subblock and independently performing a write, read, or erase operation of data on subblocks.

In the case of a conventional semiconductor device, since the degree of integration is an important factor in determining the price of a product, an increased degree of integration is particularly required.

Accordingly, three-dimensional semiconductor memory devices having three-dimensionally arranged transistors have been proposed. To increase the degree of integration of a three-dimensional memory device, technologies for reducing the volume thereof are being developed and the stability of the memory device is required as the degree of integration increases.

In the case of a memory device having a plurality of stacks, a reliability difference may exist for each memory block. The difference in reliability of memory blocks increases as the size of the memory block increases, and the bulky memory blocks consume a lot of power.

SUMMARY

According to some inventive concepts there is provided a memory device that divides a memory block into subblocks and utilizes some of the divided subblocks as a data buffer region.

By utilizing some of the divided subblocks as a data buffer region, the inventive concepts may provide a memory device with reduced power consumption. In addition, the inventive concept may provide a memory device with improved reliability and longer lifespan compared to conventional memory devices by including a data buffer region.

According to an aspect of the inventive concept, there is provided a memory device including a first subblock configured to store first data including of at least one bit; and a second subblock configured to perform an erase operation independently of the first subblock and store second data including of at least one bit, wherein, the memory device is configured to perform a read operation on the second data in response to a write operation being performed on the second data in the second subblock, and wherein, the memory device is configured to perform a write operation on the first data in the first subblock in response to a read operation being performed on the second data in the second subblock.

According to another aspect of the inventive concept, there is provided a method of operating a memory device including a plurality of memory blocks including of at least one subblock, the method including storing first data including of at least one bit in a first subblock; performing an erase operation of a second subblock independently of the first subblock; and storing second data including of at least one bit in the second subblock, and wherein the storing of the first data in the first subblock includes, in response to a write operation on the second data being performed in the second subblock, performing a read operation on the second data; and in response to a read operation on the second data being performed in the second subblock, writing the first data to the first subblock.

According to another aspect of the inventive concept, there is provided a memory system including a memory device including a plurality of memory blocks including of at least one subblock and a host controlling the memory device, wherein the memory device includes, a first subblock configured to store first data including of at least one bit; and a second subblock configured to perform an erase operation independently of the first subblock and store second data including of at least one bit, wherein the host is configured to control the memory device so that, in response to a write operation on the second data being performed in the second subblock, a read operation on the second data is performed and wherein in response to a read operation on the second data being performed in the second subblock, the first data is written in the first subblock.

The host controls the memory device so that, when a write operation on the second data is performed in the second subblock, a read operation on the second data is performed and when a read operation on the second data is performed in the second subblock, the first data is written in the first subblock.

BRIEF DESCRIPTION OF THE DRAWINGS

Example embodiments will be more clearly understood from the following detailed description taken in conjunction with the accompanying drawings in which:

FIG. 8 is a flowchart illustrating a process of transferring data within the same memory block in a method of operating a memory device, according to some example embodiments;

DETAILED DESCRIPTION

Terms used in this specification will be briefly described, and example embodiments will be described in detail.

Figure 1:
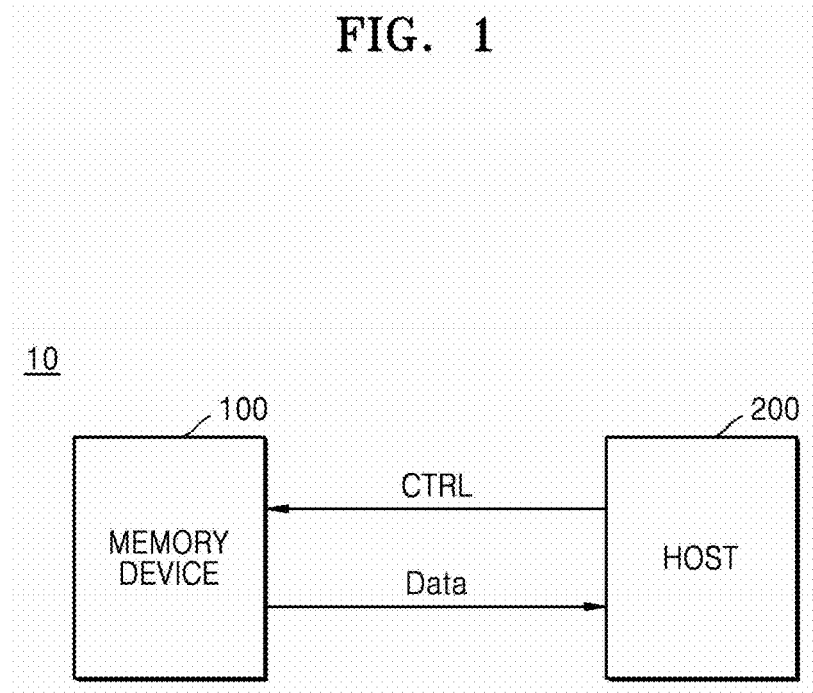
FIG. 1 is a block diagram of a memory system according to some example embodiments.

FIG. 1 is a block diagram of a memory system 10 according to some example embodiments.

Referring to FIG. 1, the memory system 10 according to some example embodiments may include a memory device 100 and a host 200. The memory device 100 according to some example embodiments receives a plurality of control signals CTRL from the host 200 and transmits written data Data to the host 200 based on the received plurality of control signals CTRL.

The memory device 100 according to some example embodiments may include a plurality of memory blocks composed of at least one subblock. A memory block according to some example embodiments may store data composed of one or more bits. For example, memory blocks may store data in units of a single level cell (SLC), a multi-level cell (MLC), a triple level cell (TLC), or a quad level cell (QLC). However, the unit in which the memory block stores data is not limited thereto and may further include a plurality of units.

A memory block according to some example embodiments may include a plurality of subblocks. For example, a memory block may include n subblocks. A subblock according to some example embodiments may refer to a unit of a storage region that exists inside one memory block and may independently perform a write, read, or erase operation. A memory block is described below as including a first subblock and a second subblock. The terms "first" and "second" for subblocks included in a memory block are simply for classifying the subblocks. Also, a memory block may further include a plurality of subblocks.

The host 200 according to some example embodiments may control the operation of the memory device 100. For example, the host 200 may control a write, read, or erase operation of data on the memory device 100. According to some example embodiments, when a write operation for arbitrary data is performed in the second subblock, the host 200 may control the memory device 100 to perform a read operation on arbitrary data written in the second subblock. When a read operation is performed on any data written in the second subblock, the host 200 according to some example embodiments may control the memory device 100 to write data in the first subblock. The operation of the host 200 is described in detail with reference to FIG. 3.

Figure 2:
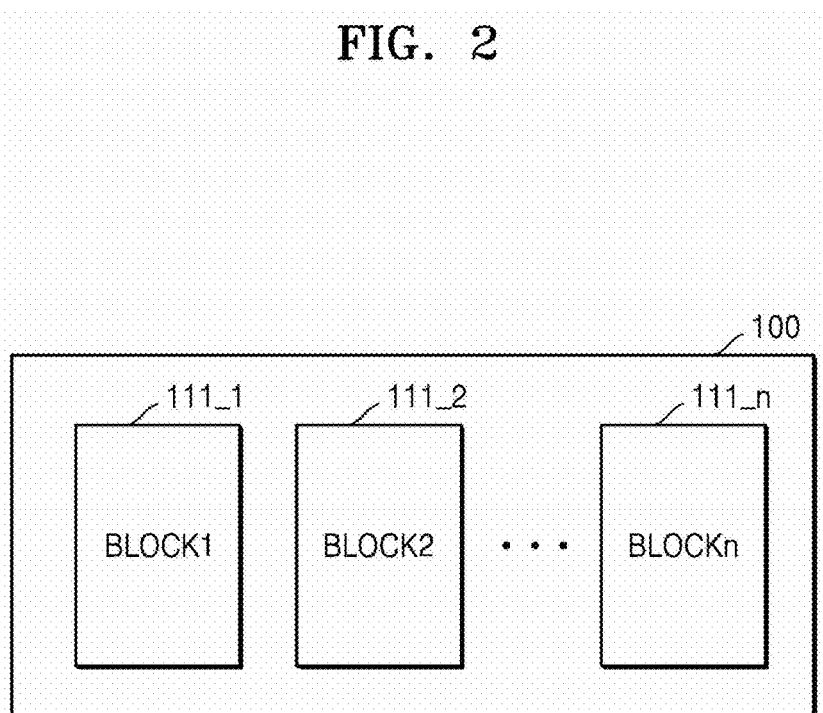
FIG. 2 is a block diagram of a memory device according to some example embodiments.

FIG. 2 is a block diagram of a memory device 100 according to some example embodiments.

Referring to FIG. 2, a memory device 100 according to some example embodiments may include a plurality of memory blocks 111_1, 111_2, . . . , and 111_n. Each of the memory blocks 111_1, 111_2, . . . , and 111_n may be composed of a plurality of stacks. For example, the memory blocks 111_1, 111_2, . . . , and 111_n may each consist of three stacks but are not limited thereto, and the memory blocks 111_1, 111_2, . . . , and 111_n may be configured to include more stacks.

As one example, the memory device 100 may include a nonvolatile memory device, such as NAND Flash Memory, Vertical NAND Flash Memory, NOR Flash Memory, Resistive Random Access Memory, Phase-Change Memory, Magnetoresistive Random Access Memory, and the like. In relation to the memory device 100 according to some example embodiments, random-access memory (RAM) may be implemented with volatile memory, such as Dynamic random-access memory (DRAM), mobile DRAM, static RAM (SRAM), parallel RAM (PRAM), ferroelectric RAM (FRAM), resistive RAM (RRAM), and/or magnetoresistive RAM (MRAM).

Figure 3:
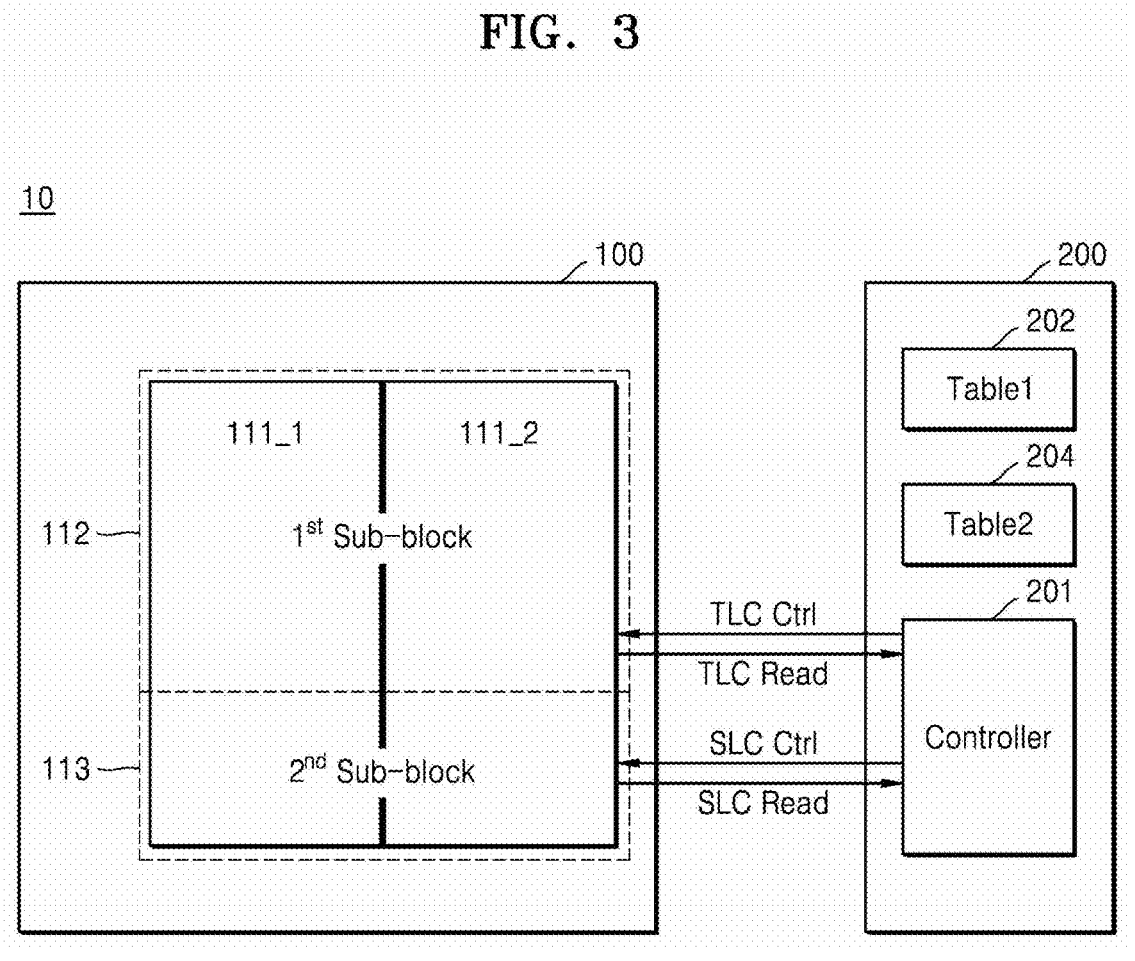
FIG. 3 is a block diagram of a memory device including subblocks according to some example embodiments.

FIG. 3 is a block diagram illustrating a memory device 100 including subblocks according to some example embodiments.

Referring to FIG. 3, the memory device 100 according to some example embodiments may include a memory block 111_1, 111_2. The memory device 100 according to some example embodiments may include a plurality of memory blocks 111_1, 111_2. For example, the memory device 100 may include a first memory block 111_1 or a second memory block 111_2. Here, the terms "first" and "second" simply serve to classify memory blocks, and the memory device 100 according to some example embodiments include more memory blocks. Each of the first memory block 111_1 and the second memory block 111_2 according to some example embodiments may be divided into a first subblock 112 or a second subblock 113. The first subblock 112 or the second subblock 113 according to some example embodiments may exist in the same memory block.

The first subblock 112 according to some example embodiments may store first data composed of one or more bits. The first data according to some example embodiments may be any data input by a user. For example, the first data may be data related to user information.

The second subblock 113 according to some example embodiments may perform an erase operation independently of the first subblock 112 and store second data composed of at least one bit. For example, the second subblock 113 is composed of a storage region inside the same memory block as the first subblock 112 or inside a memory block different from the first subblock 112, and may perform data writing, reading, or erasing operations independently of the first subblock 112. The second data according to some example embodiments may be meta data of the first data. For example, the second data may be On-Chip Buffered Programming (OBP) data or may be data configured to identify the first data.

The second subblock 113 according to some example embodiments may include a data buffer region. As the second subblock 113 includes the data buffer region, the memory device 100 according to some example embodiments may temporarily store meta data of the first data as second data and independently erase the second subblock 113. As data writing, reading, or erasing operations for the second subblock 113 are independently performed, the memory device 100 according to some example embodiments may reduce power consumption and/or reduce occurrence of bad blocks in the first subblock 112, so that a data read delay occurring in the memory device 100 may be prevented or reduced in likelihood.

The host 200 according to some example embodiments may include a controller 201, a first table 202, or a second table 204.

The controller 201 according to some example embodiments may generate control signals for controlling the operation of the memory device 100. For example, the controller 201 according to some example embodiments may generate an SLC control signal SLC Ctrl or a TLC control signal TLC Ctrl and receive an SLC read signal SLC Read or a TLC read signal TLC Read. By generating a plurality of control signals in the controller 201, according to some example embodiments, the first data may be stored in a TLC or quad QLC unit and the second data may be stored in an SLC unit. In addition, although not shown in the drawing, the controller 201 according to some example embodiments may generate a QLC control signal QLC Ctrl and receive a QLC read signal QLC Read. As the SLC control signal SLC Ctrl or the TLC control signal TLC Ctrl is generated by the controller 201, when the writing of the second data of the SLC level is completed, the host 200 according to some example embodiments writes the first data of the TLC level into the first subblock 112, so that data stored in the second subblock 113 may be transferred to the first subblock 112.

The host 200 according to some example embodiments may generate an SLC control signal SLC Ctrl and transfer the generated SLC control signal SLC Ctrl to the second subblock 113. When the SLC control signal SLC Ctrl is received, the second subblock 113 according to some example embodiments may perform an SLC level write or read operation on the second data and transmit an SLC read signal SLC Read to the controller 201. When the SLC read signal SLC Read is received, the controller 201 according to some example embodiments may generate a TLC control signal TLC Ctrl and transmit the generated TLC control signal TLC Ctrl to the first subblock 112. When the TLC control signal TLC Ctrl is received, the first subblock 112 according to some example embodiments may perform a TLC level write or read operation on the first data and transmit a TLC read signal TLC Read to the controller 201.

The first table 202 according to some example embodiments may store information about the first data. The second table 204 according to some example embodiments may store information about the second data. The controller 201 according to some example embodiments may generate a plurality of control signals based on information stored in the first table 202 or the second table 204.

Figure 4:
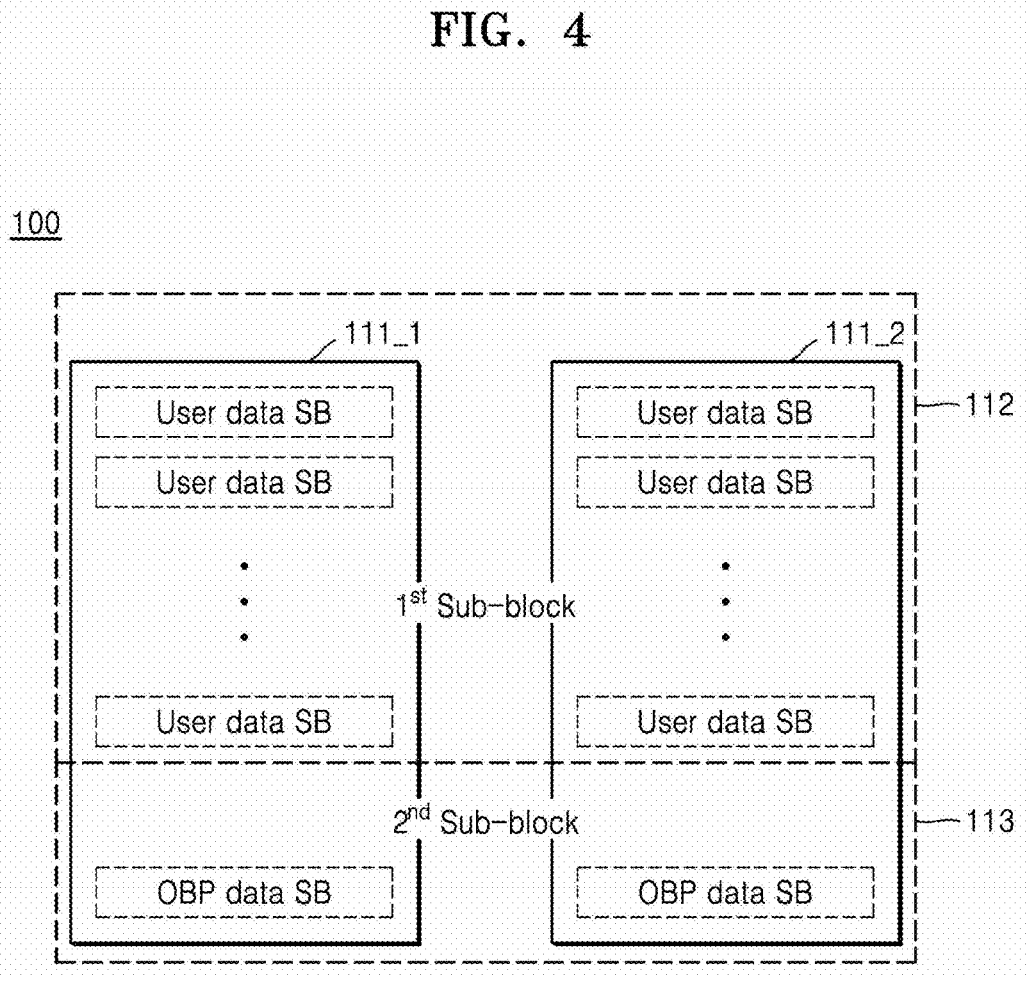
FIG. 4 is a block diagram illustrating subblocks of a memory device according to some example embodiments.

FIG. 4 is a block diagram illustrating subblocks of a memory device 100 according to some example embodiments.

Referring to FIG. 4, the memory device 100 according to some example embodiments includes a first memory block 111_1 and/or a second memory block 111_2, and the first memory block 111_1 and/or the second memory block 111_2 may be divided into a first subblock 112 and a second subblock 113.

Arbitrary data input by a user may be stored in the region of the first subblock 112 according to some example embodiments. For example, the first subblock 112 may include a plurality of user data subblocks User data SBs and store arbitrary data in TLC or QLC units. Second data including information about the first data may be stored in the region of the second subblock 113 according to some example embodiments. For example, the second subblock 113 may include a plurality of OBP data subblocks OBP data SB and store meta data for the first data in SLC units. For example, the first data stored in the first subblock 112 may be user information data (e.g., user data) for which an erase operation is performed according to an erase request from the host 200, and the second data stored in the second subblock 113 may be self-erasable data without a request from the host 200. For example, the second data may be data that is self-erased in an exceptional situation such as power loss.

The first subblock 112 and the second subblock 113 according to some example embodiments may be independently controlled. For example, the first subblock 112 and the second subblock 113 may independently write, read, or erase data. Arbitrary firmware may be included in the first subblock 112 and the second subblock 113 according to some example embodiments.

According to some example embodiments, the second data stored in the second subblock 113 of the first memory block 111_1 may be transferred to the first subblock 112 of the first memory block 111_1. That is, the second data stored in the second subblock 113 according to some example embodiments may be transferred to the first subblock 112 of the same memory block, and an erase operation on the second subblock 112 may be independently performed. For example, when the second data stored in the second subblock 113 of the first memory block 111_1 is transferred to the first subblock 112 of the first memory block 111_1, the memory device 100 according to some example embodiments may perform an erase operation on the second subblock 113 of the first memory block 111_1.

According to some example embodiments, the second data stored in the second subblock 113 of the first memory block 111_1 may be transferred to the first subblock 112 of the second memory block 111_2. That is, the second data stored in the second subblock 113 according to some example embodiments may be transferred to the first subblock 112 of a different memory block, and an erase operation on the second subblock 112 may be independently performed. For example, when the second data stored in the second subblock 113 of the first memory block 111_1 is transferred to the first subblock 112 of the second memory block 111_2, the memory device 100 according to some example embodiments may perform an erase operation on the second subblock 113 of the second memory block 111_2.

Figure 5:
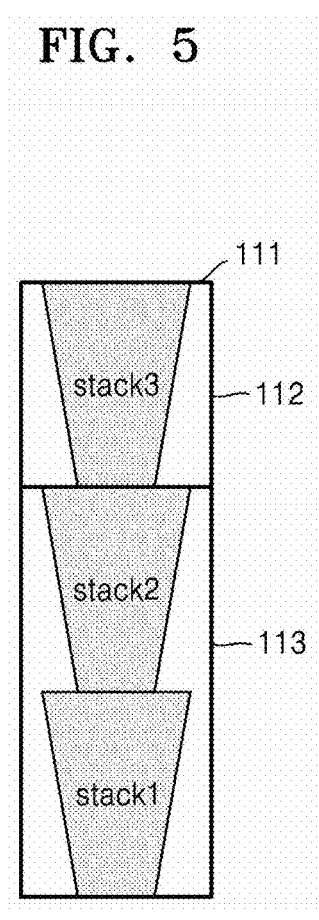
FIG. 5 is a diagram for describing a criterion for classifying subblocks in a memory device according to some example embodiments.

FIG. 5 is a diagram for describing a criterion for classifying subblocks in a memory device according to some example embodiments.

Referring to FIG. 5, a memory block 111 according to some example embodiments may include a plurality of stacks. Although the memory block 111 according to one example embodiment is shown in FIG. 5 as including three stacks, the inventive concepts are not limited thereto and may include more stacks. However, with respect to FIG. 5, for convenience, some example embodiments including three stacks is described.

According to some example embodiments, the first subblock 112 may include a third stack stack3 and the second subblock 113 may include a first stack Stack1 or a second stack Stack2. The second subblock 113 according to some example embodiments may be configured to include a region with the highest reliability in the memory block 111. When the second subblock 113 is configured to include a region with the highest reliability in the memory block 111, the memory device 100 according to some example embodiments may enhance endurance of a data buffer region. Conversely, the second subblock 113 according to some example embodiments may be configured to include a region with the weakest reliability in the memory block 111. When the second subblock 113 is configured to include a region with the weakest reliability in the memory block 111, the memory device 100 according to some example embodiments may extend the lifespan of the first subblock 112.

Although FIG. 5 shows that the first sub-region (e.g. first subblock) 112 includes the third stack Stack3 and the second sub-region (second subblock) 113 includes the first stack Stack1 or the second stack Stack2, the inventive concept is not limited, and in the memory block 111 according to some example embodiments, the first sub-region 112 may include the third stack Stack3 and/or the second stack Stack2 and the second sub-region 113 may include the first stack Stack1 in this combination. In addition, in the memory block 111 according to some example embodiments, the first sub-region 112 includes the second stack Stack2 and the second sub-region 113 includes the first stack Stack1 in this combination. In addition, in the memory block 111 according to some example embodiments, the first sub-region 112 includes a third stack Stack3 and the second sub-region 113 includes a second stack Stack2 in this combination. The example embodiments described above are only examples of stacks that may constitute the memory block 111, and when more stacks are included, the memory block 111 may include various combinations of subblocks.

Figure 6:
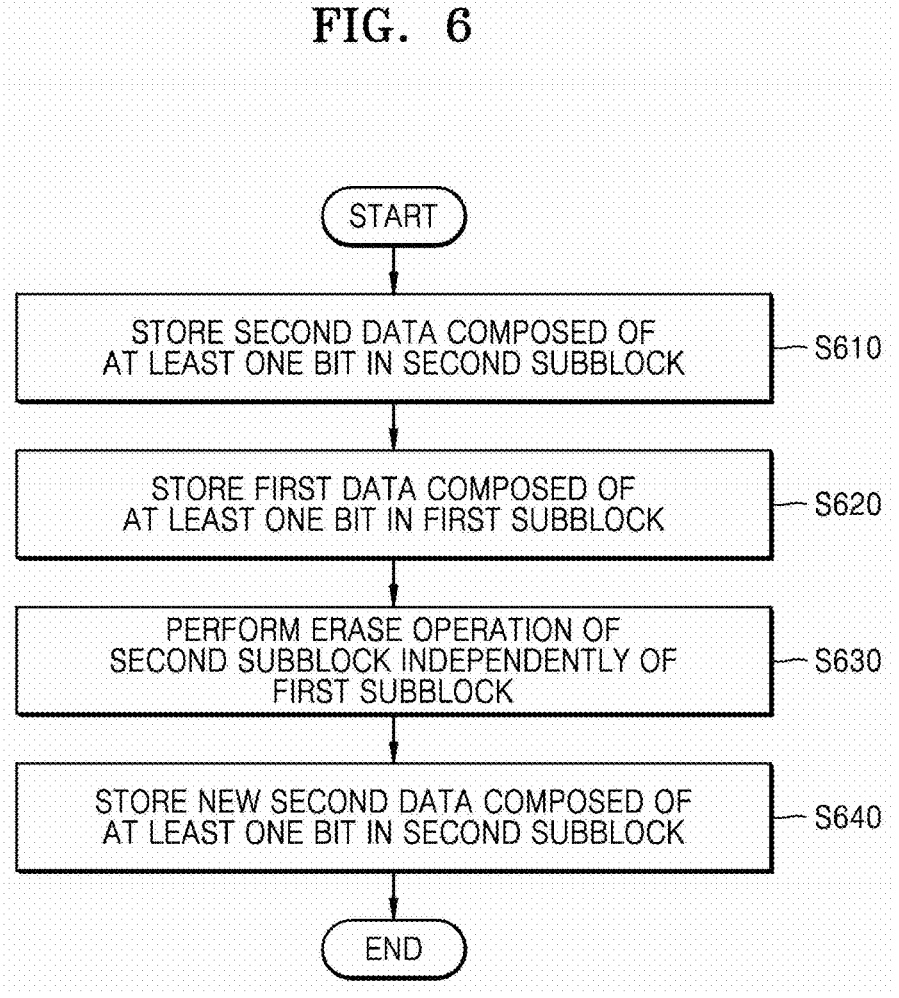
FIG. 6 is a flowchart of a method of operating a memory device, according to some example embodiments.

FIG. 6 is a flowchart of a method of operating a memory device, according to some example embodiments.

Referring to FIG. 6, the memory device 100 according to some example embodiments may store second data composed of one or more bits in a second subblock 113 in operation S610. The second data according to some example embodiments may be meta data of the first data. For example, the second data may be OBP data or may be data configured to identify the first data.

When the second data is stored therein, the memory device 100 according to some example embodiments may store first data composed of one or more bits in the first subblock 112 in operation S620.

The first data according to some example embodiments may be any data input by a user. For example, the first data may be data related to user information. The first data according to some example embodiments may be stored in TLC or QLC units.

When the first data is stored, the memory device 100 according to some example embodiments may perform an erase operation of the second subblock 113 independently of the first subblock 112 in operation S630.

For example, the second subblock 113 of the memory device 100 is composed of a storage region inside the same memory block as the first subblock 112 or inside a memory block different from the first subblock 112, and may perform a write, read, or erase operation of data independently of the first subblock 112. As data writing, reading, or erasing operations for the second subblock 113 are independently performed, the memory device 100 according to some example embodiments may reduce power consumption and reduce occurrence of bad blocks in the first subblock 112, so that a data read delay problem occurring in the memory device 100 may be solved.

When the erase operation of the second subblock 113 is performed, the memory device 100 according to some example embodiments may store new second data composed of one or more bits in the second subblock 112 in operation S640.

The second subblock 112 according to some example embodiments may serve as a data buffer region. By including the data buffer region, the memory device 100 according to some example embodiments may temporarily store meta data of the first data as second data and independently erase the second subblock 113. According to some example embodiments, the second data may be stored in units of SLCs.

Figure 7:
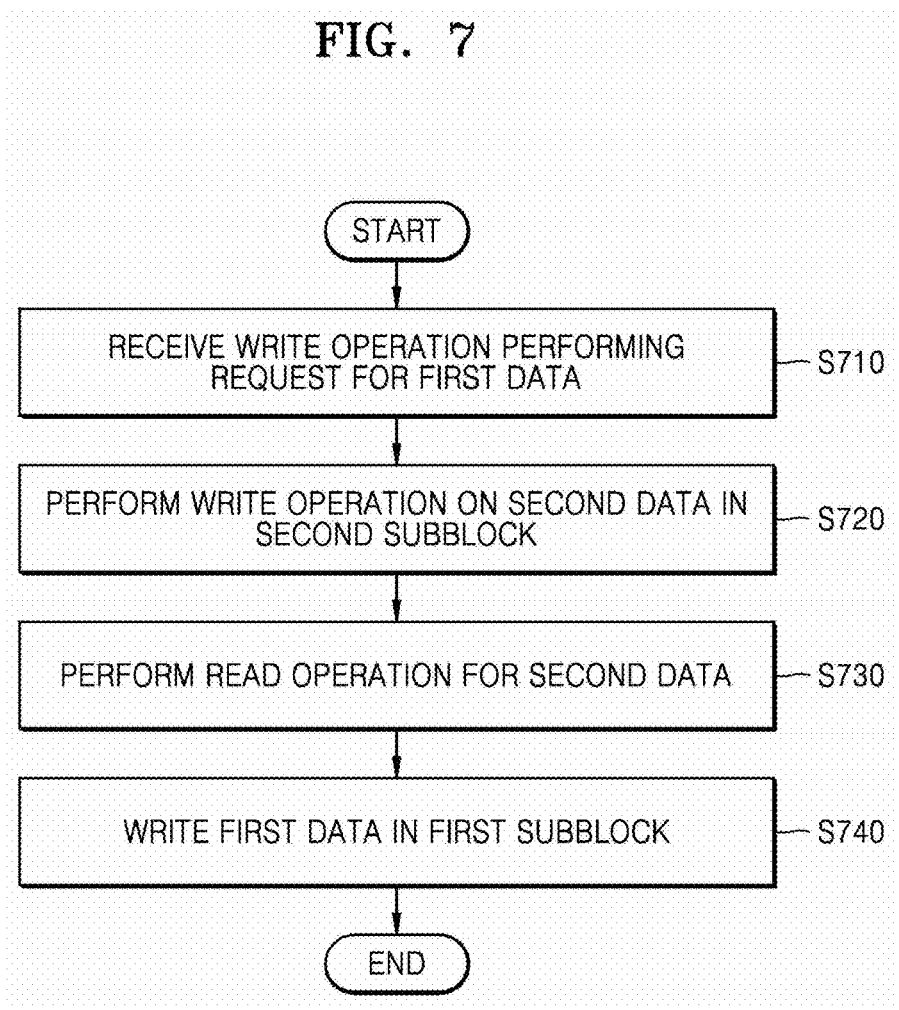
FIG. 7 is a flowchart illustrating a process of writing data in a method of operating a memory device, according to some example embodiments.

FIG. 7 is a flowchart illustrating a process of writing data in a method of operating a memory device, according to some example embodiments.

Referring to FIG. 7, the memory device 100 according to some example embodiments may receive a write operation performing request for first data in operation S710.

When a write operation performing request for the first data is received, the memory device 100 according to some example embodiments may perform a write operation for the second data in the second subblock 113 in operation S720.

The memory device 100 according to some example embodiments may receive the SLC control signal SLC Ctrl and write second data into the second subblock 113 based on the received SLC control signal SLC Ctrl. When the second sub-region 113 according to some example embodiments is used as a data buffer region, the memory device 100 may temporarily store second data in the second subblock 113.

When a write operation on the second data is performed on the second subblock 113, the memory device 100 according to some example embodiments may perform a read operation on the second data in operation S730.

According to some example embodiments, the memory device 100 may read the second data in SLC units and generate an SLC read signal SLC Read. For example, the memory device 100 may read the second data and transmit the generated SLC read signal SLC Read to the host 200.

When a read operation on the second data is performed, the memory device 100 according to some example embodiments may write the first data into the first subblock 112 in operation S740.

For example, when writing the second data of the SLC level is completed, the memory device 100 according to some example embodiments writes first data of a TLC level into the first sub-region 112, so that data stored in the second sub-block 113 may be transferred to the first sub-region 112. The second data according to some example embodiments may be converted into first data in TLC units.

FIG. 8 is a flowchart illustrating a process of transferring data within the same memory block in a method of operating a memory device, according to some example embodiments.

Referring to FIG. 8, the memory device 100 according to some example embodiments may perform a write operation on second data in the data buffer region of the second subblock 112 of the first memory block 111_1 in operation S810.

When a write operation for the second data is performed, the memory device 100 according to some example embodiments may transfer the second data written in the data buffer region of the first memory block 111_1 to the first subblock 112 of the first memory block 111_1 in operation S820.

The memory device 100 according to some example embodiments may transfer the second data stored in the second subblock 113 to the first subblock 112 of the same memory block. When the writing of the second data of the SLC level is completed, the first data of the TLC level is written to the first subblock 112 of the same memory block, so that the memory device 100 according to some example embodiments may transfer data stored in the second sub-block 113 to the first subblock 112 of the same memory block.

When the second data is transferred to the first subblock 112 of the first memory block 111_1, the memory device 100 according to some example embodiments may perform an erase operation on the data buffer region of the second subblock 113 of the first memory block 111_1 in operation S830.

The first subblock 112 and the second subblock 113 according to some example embodiments may be independently controlled within the same memory block. For example, the first subblock 112 and the second subblock 113 of the first memory block 111_1 may independently write, read, or erase data.

When an erase operation is performed on the data buffer region of the second subblock of the first memory block 111_1, the memory device 100 according to some example embodiments may perform a write operation on new second data in the data buffer region of the second subblock 113 of the first memory block 111_1 in operation S840.

The second subblock 112 according to some example embodiments may serve as a data buffer region. By including the data buffer region, the memory device 100 according to some example embodiments may temporarily store meta data for first data as second data in one memory block and independently erase the second subblock 113.

Figure 9:
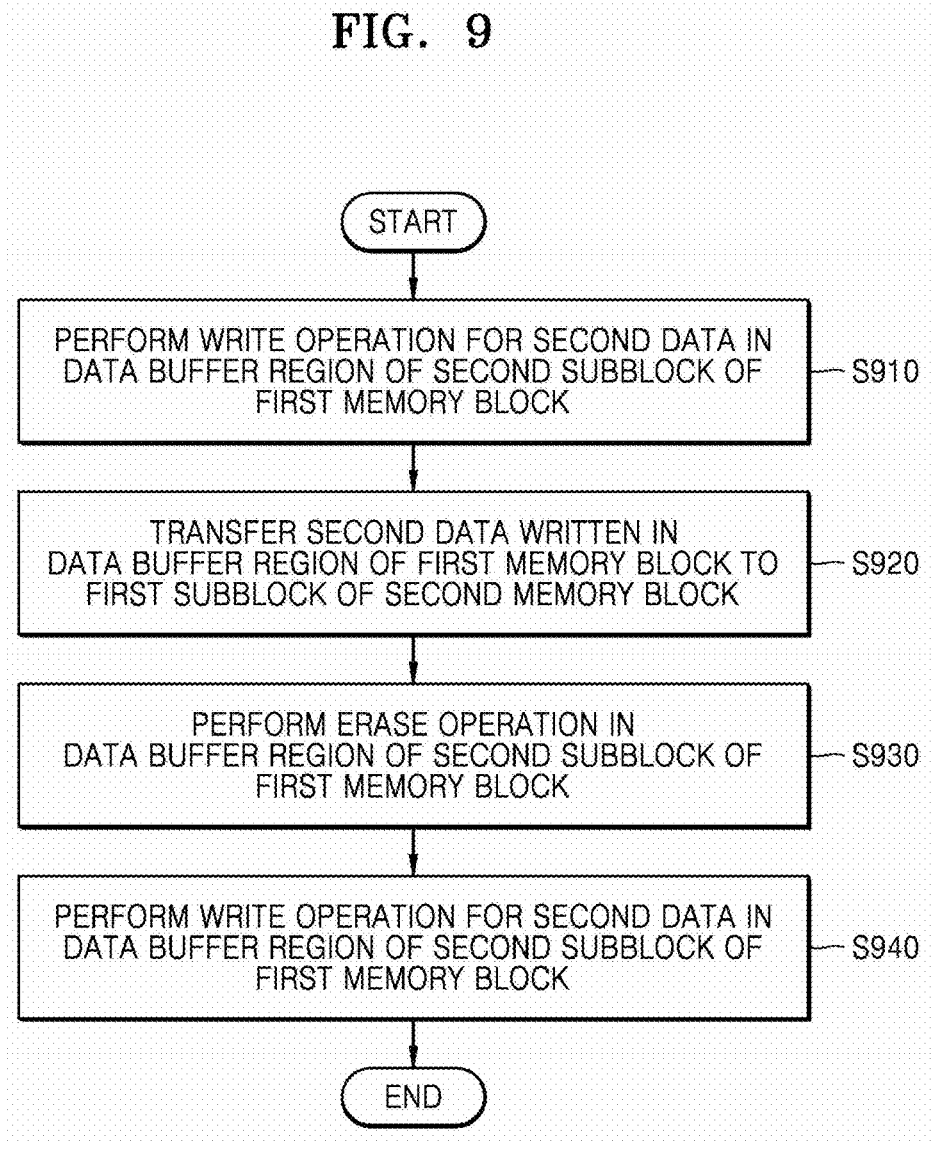
FIG. 9 is a flowchart illustrating a process of transferring data to another memory block in a method of operating a memory device, according to some example embodiments.

FIG. 9 is a flowchart illustrating a process of transferring data to another memory block in a method of operating a memory device, according to some example embodiments.

Referring to FIG. 9, the memory device 100 according to some example embodiments may perform a write operation on second data in the data buffer region of the second subblock 112 of the first memory block 111_1 in operation S910.

When a write operation for the second data is performed, the memory device 100 according to some example embodiments may transfer the second data written in the data buffer region of the first memory block 111_1 to the first subblock 112 of the second memory block 111_2 in operation S920.

The memory device 100 according to some example embodiments may transfer the second data stored in the second subblock 113 to the first subblock 112 of a different memory block. When the writing of the second data of the SLC level is completed, the first data of the TLC level is written to the first subblock 112 of a different memory block, so that the memory device 100 according to some example embodiments may transfer data stored in the second subblock 113 to the first subblock 112 of a different memory block.

When the second data is transferred to the first subblock 112 of the second memory block 111_2, the memory device 100 according to some example embodiments may perform an erase operation on the data buffer region of the second subblock 113 of the first memory block 111_1 in operation S930.

The first subblock 112 and the second subblock 113 according to some example embodiments may be independently controlled within different memory blocks. For example, the second subblock 113 of the first memory block 111_1 and the first subblock 112 of the second memory block 111_2 may independently write, read, or erase data.

When an erase operation is performed on the data buffer region of the second subblock 113 of the first memory block 111_1, the memory device 100 according to some example embodiments may perform a write operation on new second data in the data buffer region of the second subblock 113 of the first memory block 111_1 in operation S940.

The second subblock 112 of the first memory block 111_1 according to some example embodiments may serve as a data buffer region for the second memory block 111_2. By including the data buffer region, the memory device 100 according to some example embodiments temporarily may store metadata for first data in a plurality of memory blocks as second data in a first memory block 111_1, and independently erase the second subblock 113 of the first memory block 111_1.

Figure 10:
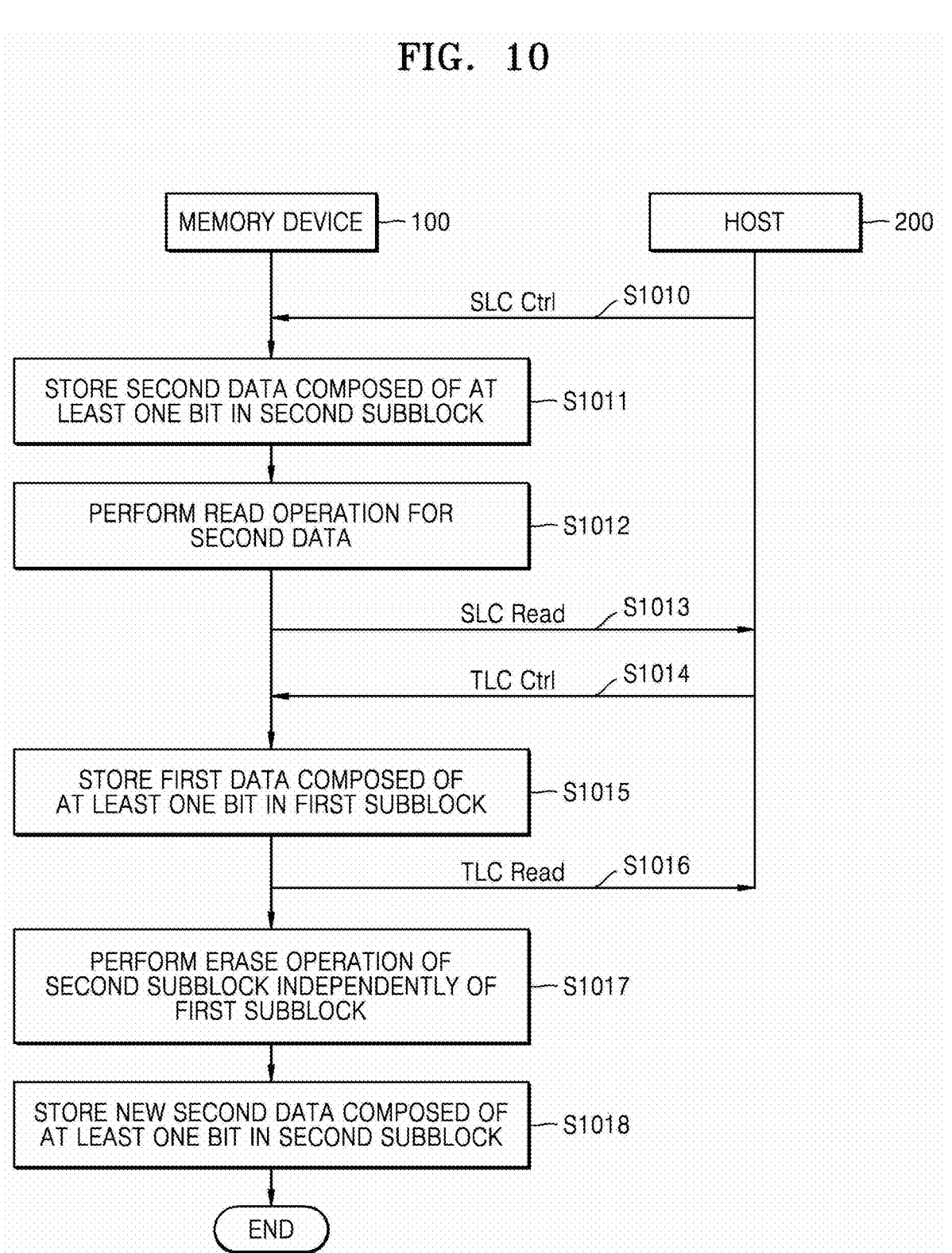
FIG. 10 is a flowchart illustrating a method of operating a memory device, according to some example embodiments.

FIG. 10 is a flowchart illustrating a method of operating a memory device, according to some example embodiments.

Referring to FIG. 10, the memory device 100 according to some example embodiments may perform a write, read, or erase operation on data according to a control signal of the host 200. The memory device 100 according to some example embodiments may receive a write operation performing request for the first data. When a write operation performing request for the first data is received, the memory device 100 according to some example embodiments may perform a write operation for the second data in the second subblock 113.

To perform a write operation on second data, the host 200 according to some example embodiments may generate the SLC control signal SLC Ctrl and the memory device 100 may receive the SLC control signal SLC Ctrl from the host 200 in operation S1010.

When a write operation performing request for the first data is received, the memory device 100 according to some example embodiments may perform a write operation for the second data in the second subblock 113 in operation S1011.

The memory device 100 according to some example embodiments may receive the SLC control signal SLC Ctrl and write second data into the second subblock 113 based on the received SLC control signal SLC Ctrl. When the second sub-region 113 according to some example embodiments is used as a data buffer region, the memory device 100 may temporarily store second data in the second subblock 113.

When a write operation on the second data is performed on the second subblock 113, the memory device 100 according to some example embodiments may perform a read operation on the second data in operation S1012. According to some example embodiments, the memory device 100 may read the second data in SLC units.

When a read operation is performed on the second data, according to some example embodiments, the memory device 100 may generate an SLC read signal SLC Read and transmit the generated SLC read signal SLC Read to the host 200 in operation S1013. Second data according to some example embodiments may be written, read, or erased in units of SLCs. The host 200 according to some example embodiments may generate an SLC control signal SLC Ctrl and transfer the generated SLC control signal SLC Ctrl to the second subblock 113. When the SLC control signal SLC Ctrl is received, the second subblock 113 according to some example embodiments may perform an SLC level write or read operation on the second data and transmit an SLC read signal SLC Read to the controller 201.

When the SLC read signal SLC Read is received, the host 200 according to some example embodiments may generate a TLC control signal TLC Ctrl and transfer the generated TLC control signal TLC Ctrl to the memory device 100 in operation S1014. When the TLC control signal TLC Ctrl is received, the first subblock 112 of the memory device 100 according to some example embodiments may perform a TLC level write or read operation on first data and transmit a TLC read signal (TLC Read) to the host 200. The second data according to some example embodiments may be written, read, or erased in units of TLC or QLC.

When a read operation on the second data is performed, the memory device 100 according to some example embodiments may store first data composed of one or more bits in the first subblock 112 in operation S1015.

For example, when writing the second data of the SLC level is completed, the memory device 100 according to some example embodiments writes first data of a TLC level into the first sub-region 112, so that data stored in the second sub-block 113 may be transferred to the first sub-region 112. The second data according to some example embodiments may be converted into first data in TLC units.

According to some example embodiments, the memory device 100 may read the first data in units of TLC, generate a TLC read signal TLC Read, and transfer the generated TLC read signal TLC Read to the host 200 in operation S1016.

When the first data is stored, the memory device 100 according to some example embodiments may perform an erase operation of the second subblock 112 independently of the first subblock 113 in operation S1017.

For example, the second subblock 113 of the memory device 100 is composed of a storage region inside the same memory block as the first subblock 112 or inside a memory block different from the first subblock 112, and may perform a write, read, or erase operation of data independently of the first subblock 112. As data writing, reading, or erasing operations for the second subblock 113 are independently performed, the memory device 100 according to some example embodiments may reduce power consumption and reduce occurrence of bad blocks in the first subblock 112, so that a data read delay problem occurring in the memory device 100 may be solved.

When the erase operation of the second subblock 113 is performed, the memory device 100 according to some example embodiments may store new second data composed of one or more bits in the second subblock 112 in operation S1018.

The second subblock 112 according to some example embodiments may serve as a data buffer region. By including the data buffer region, the memory device 100 according to some example embodiments may temporarily store meta data of the first data as second data and independently erase the second subblock 113. According to some example embodiments, the second data may be stored in units of SLCs.

FIGS. 11 to 14 are diagrams for describing a three-dimensional V-NAND structure applicable to a memory device according to some example embodiments.

Figure 11:
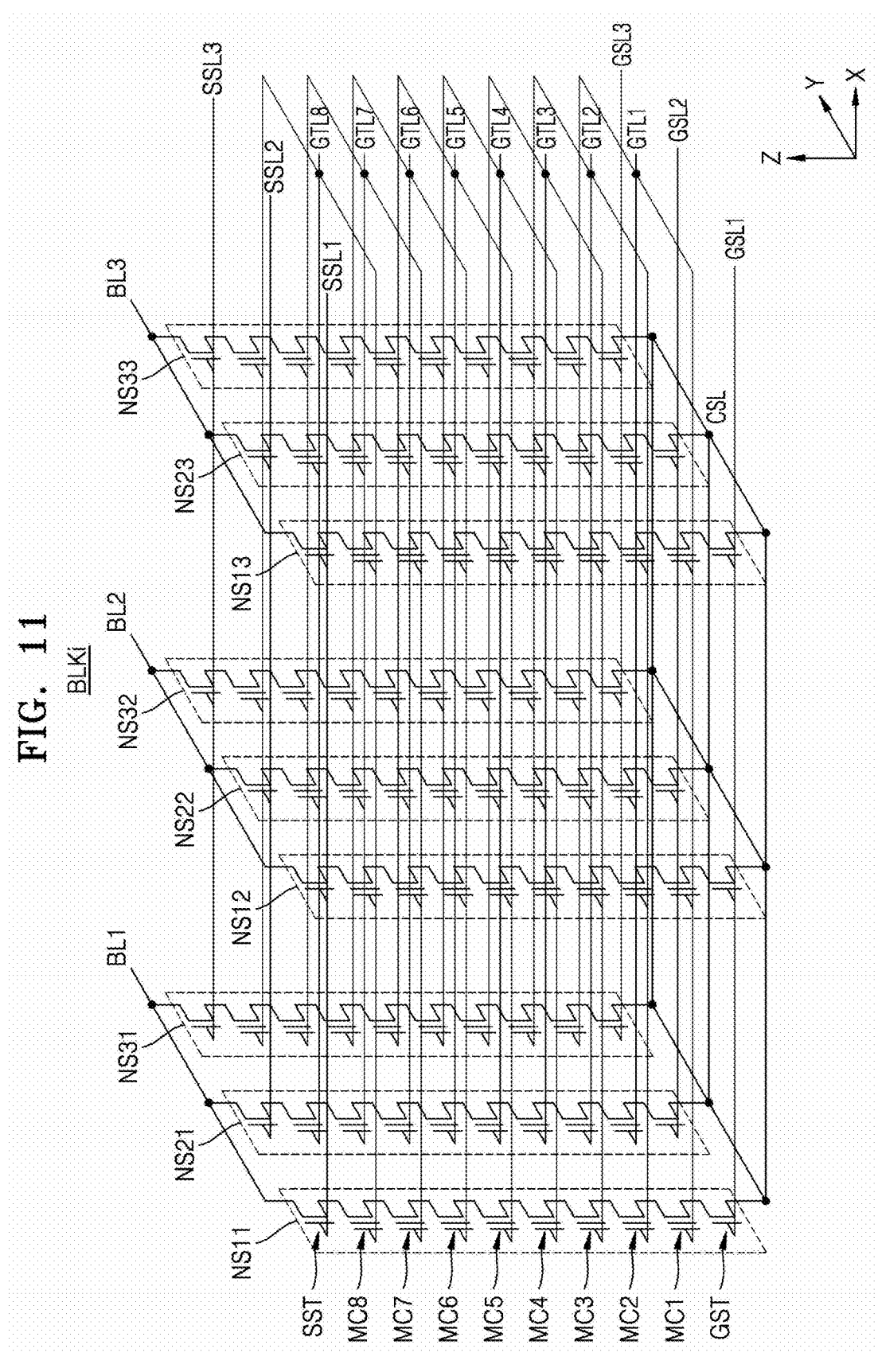
FIGS. 11 to 14 are diagrams for describing a 3D V-NAND structure applicable to a memory device according to some example embodiments.
Figure 12:
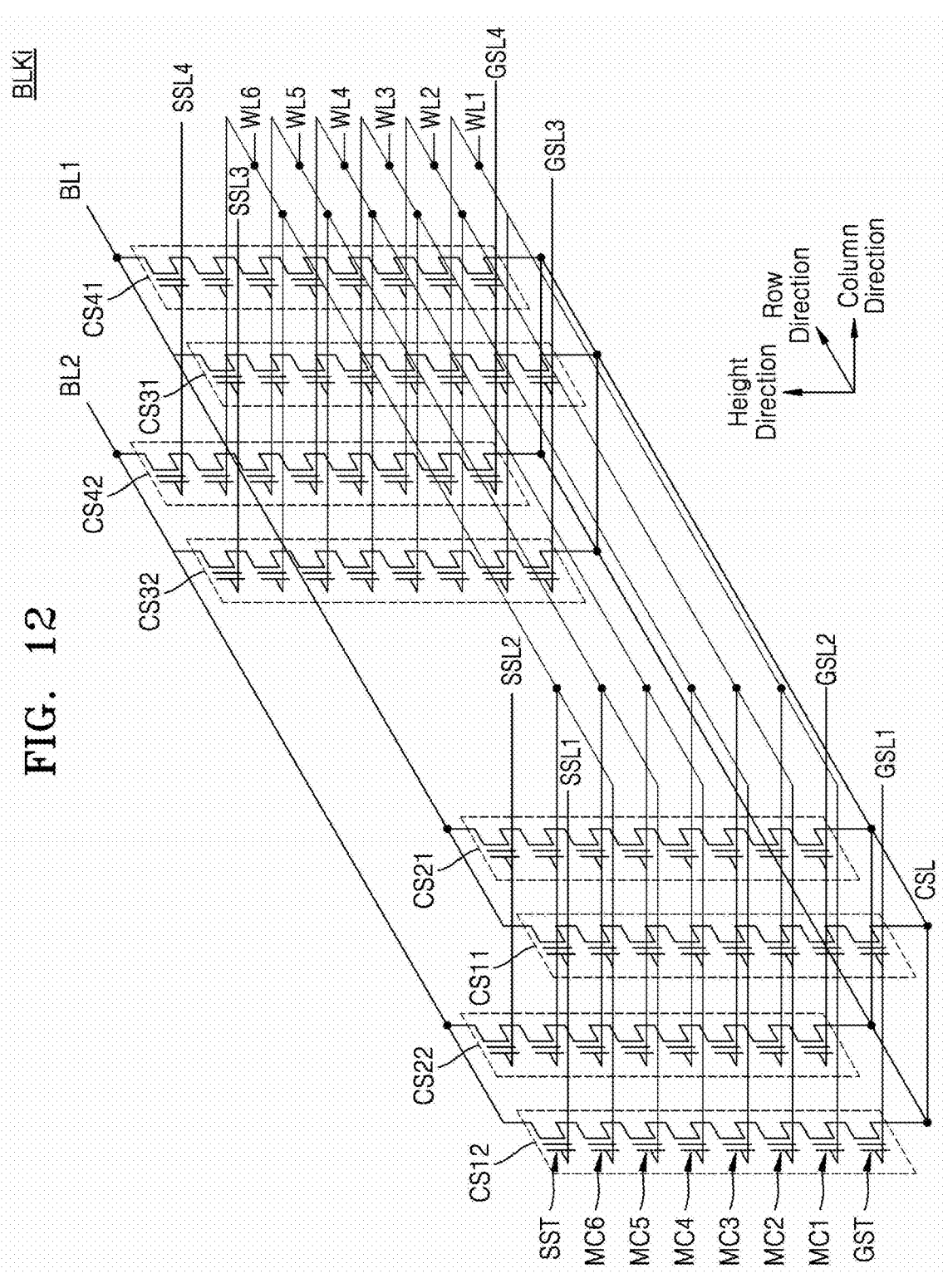
Figure 13:
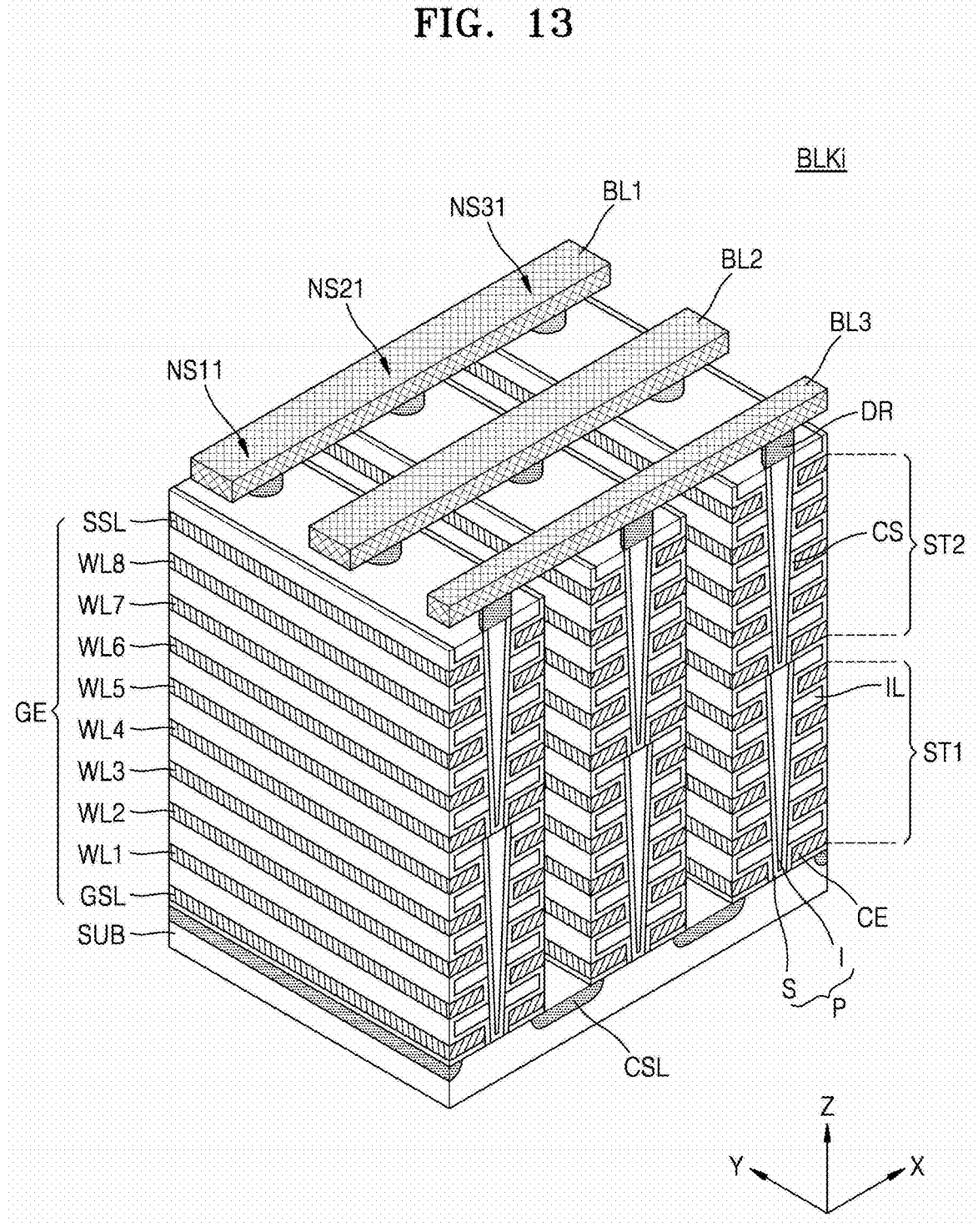

The nonvolatile memory 130_1 applicable to the memory device 100 (see FIG. 1) may include a plurality of memory blocks. FIGS. 11, 12, and 13 illustrate a structure of one memory block BLKi among a plurality of memory blocks, and FIG. 14 describes an implementation example of a nonvolatile memory.

Referring to FIG. 11, the memory block BLKi may include a plurality of memory NAND strings NS11 to NS33 connected between the bit lines BL1, BL2, and BL3 and the common source line CSL. Each of the plurality of memory NAND strings NS11 to NS33 may include a string select transistor SST, a plurality of memory cells MC1 to MC8, and a ground select transistor GST. For brevity of the drawing, FIG. 11 shows that each of the plurality of memory NAND strings NS11 to NS33 includes eight memory cells MC1 to MC8 but is not necessarily limited thereto.

The string select transistor SST may be connected to corresponding string select lines SSL1, SSL2, and SSL3. The plurality of memory cells MC1 to MC8 may be connected to corresponding gate lines GTL1 to GTL8, respectively. The gate lines GTL1 to GTL8 may correspond to word lines, and some of the gate lines GTL1 to GTL8 may correspond to dummy word lines. The ground select transistor GST may be connected to corresponding ground select lines GSL1, GSL2, and GSL3. The string select transistor SST may be connected to corresponding bit lines BL1, BL2, and BL3, and the ground select transistor GST may be connected to the common source line CSL.

The gate lines (e.g., GTL1) of the same height may be commonly connected, and the ground select lines GSL1, GSL2, and GSL3 and the string select lines SSL1, SSL2, and SSL3 may be separated from each other. In FIG. 11, the memory block BLK is illustrated as being connected to eight gate lines GTL1 to GTL8 and three bit lines BL1, BL2, and BL3 but is not necessarily limited thereto.

FIG. 12 is a circuit diagram illustrating a memory block BLKi according to some example embodiments.

Referring to FIG. 12, the memory block BLKi includes a plurality of cell strings CS11 to CS41 and CS12 to CS42. The plurality of cell strings CS11 to CS41 and CS12 to CS42 may be arranged in row and column directions to form rows and columns.

Each cell string includes a ground select transistor GST, memory cells MC1 to MC6, and a string select transistor SST. The ground select transistor GST of each cell string, the memory cells MC1 to MC6, and the string select transistor SST may be stacked in a height direction perpendicular to the substrate.

Rows of the plurality of cell strings CS11 to CS41 and CS12 to CS42 are respectively connected to different string select lines SSL1 to SSL4. For example, the string select transistors SST of the cell strings CS11 and CS12 are commonly connected to the string select line SSL1. The string select transistors SST of the cell strings CS21 and CS22 are commonly connected to the string select line SSL2. The string select transistors SST of the cell strings CS31 and CS32 are commonly connected to the string select line SSL3. The string select transistors SST of the cell strings CS41 and CS42 are commonly connected to the string select line SSL4.

Columns of the plurality of cell strings CS11 to CS41 and CS12 to CS42 are respectively connected to different bit lines BL1 and BL2. For example, the string select transistors SST of the cell strings CS11 to CS41 are commonly connected to the bit line BL1. The string select transistors SST of the cell strings CS12 to CS42 are commonly connected to the bit line BL2.

Rows of the plurality of cell strings CS11 to CS41 and CS12 to CS42 are respectively connected to different ground select lines GSL1 to GSL4. For example, the ground select transistors GST of the cell strings CS11 and CS12 are commonly connected to the ground select line GSL1. The ground select transistors GST of the cell strings CS21 and CS22 are commonly connected to the ground select line GSL2. The ground select transistors GST of the cell strings CS31 and CS32 are commonly connected to the ground select line GSL3. The ground select transistors GST of the cell strings CS41 and CS42 are commonly connected to the ground select line GSL4.

Memory cells located at the same height from the substrate (or ground select transistors (GST)) may be commonly connected to one word line, and memory cells positioned at different heights may be respectively connected to different word lines WL1 to WL6. For example, the memory cells MC1 are commonly connected to the word line WL1. The memory cells MC2 are commonly connected to the word line WL2. The memory cells MC3 are commonly connected to the word line WL3. The memory cells MC4 are commonly connected to the word line WL4. The memory cells MC5 are commonly connected to the word line WL5. The memory cells MC6 are commonly connected to the word line WL6.

The ground select transistors GST of the cell strings CS11 to CS41 and CS12 to CS42 are commonly connected to the common source line CSL.

The memory block BLKi shown in FIG. 12 is an example embodiment. The technical idea of the inventive concepts are not limited to the memory block BLKi shown in FIG. 12. For example, the number of rows of cell strings may be increased or decreased. As the number of rows of cell strings is changed, the number of string select lines connected to the rows of cell strings and the number of cell strings connected to one bit line may also be changed. As the number of rows of cell strings is changed, the number of ground select lines connected to the rows of cell strings may also be changed.

The number of columns of cell strings may be increased or decreased. As the number of columns of cell strings is changed, the number of bit lines connected to columns of cell strings and the number of cell strings connected to one string select line may also be changed.

The height of the cell strings may be increased or decreased. For example, the number of memory cells stacked in each of the cell strings may increase or decrease. As the number of memory cells stacked on each of the cell strings is changed, the number of word lines may also be changed. For example, the number of string select transistors or ground select transistors provided to each of the cell strings may be increased. As the number of string select transistors or ground select transistors provided to each of the cell strings is changed, the number of string select lines or ground select lines may also be changed. When the number of string select transistors or ground select transistors increases, the string select transistors or ground select transistors may be stacked in the same form as the memory cells MC1 to MC6.

Illustratively, writing and reading may be performed in units of rows of the cell strings CS11 to CS41 and CS12 to CS42. The cell strings CS11 to CS41 and CS12 to CS42 are selected in units of one row by the ground select lines GSL1 to GSL4, and the cell strings CS11 to CS41 and CS12 to CS42 may be selected in units of one row by the string select lines SSL1 to SSL4. Also, voltage may be applied to the ground select lines GSL1 to GSL4 as a unit of at least two ground select lines GSL1 to GSL2 or GSL3 to GSL4. Voltage may be applied to the ground select lines GSL1 to GSL4 as a unit. The ground select lines GSL1 to GSL4 according to some example embodiments may be programmed to have a preset threshold voltage.

In the selected row of the cell strings CS11 to CS41 and CS12 to CS42, writing and reading may be performed in units of pages. A page may be one row of memory cells coupled to one word line. In the selected rows of the cell strings CS11 to CS41 and CS12 to CS42, memory cells may be selected in units of pages by the word lines WL1 to WL6.

Further referring to FIG. 13, the memory block BLKi is formed in a direction perpendicular to the substrate SUB. The memory cells constituting the memory NAND strings NS11 to NS33 are formed by stacking a plurality of semiconductor layers.

A common source line CSL extending in a first direction (Y direction) is provided on the substrate SUB. On the region of the substrate SUB between two adjacent common source lines CSL, a plurality of insulating films IL extending in a first direction (Y direction) may be sequentially provided in a third direction (Z direction), and the plurality of insulating films IL may be spaced apart by a certain distance in the third direction (Z direction). On the region of the substrate SUB between two adjacent common source lines CSL, as being sequentially disposed in the first direction (Y direction) and passing through a plurality of insulating films IL in the third direction (Z direction), a plurality of pillars P are provided. The plurality of pillars P may penetrate the plurality of insulating films IL to make contact with the substrate SUB. A surface layer S of each pillar P may include a silicon material doped with a first conductivity type and may function as a channel region.

The inner layer I of each pillar P may include an insulating material, such as silicon oxide or an air gap. In a region between two adjacent common source lines CSL, a charge storage layer CS is provided along exposed surfaces of the insulating films IL, the pillars P, and the substrate SUB. The charge storage layer CS may include a gate insulating layer (also referred to as a 'tunneling insulating layer'), a charge trap layer, and a blocking insulating layer. Also, in a region between two adjacent common source lines CSL, gate electrodes GE such as select lines GSL and SSL and word lines WL1 to WL8 are provided on the exposed surface of the charge storage layer CS. Drains or drain contacts DR may be provided on the plurality of pillars P, respectively. On the drains or drain contacts DR, bit lines BL1 to BL3 extending in the second direction (X direction) and spaced apart from each other by a certain distance in the first direction (Y direction) may be provided.

As shown in FIG. 13, each of the memory NAND strings NS11 to NS33 may be implemented in a structure in which a first memory stack ST1 and a second memory stack ST2 are stacked. The first memory stack ST1 is connected to the common source line CSL, the second memory stack ST2 is connected to the bit lines BL1 to BL3, and the first memory stack ST1 and the second memory stack ST2 are stacked to share channel holes with each other.

Figure 14:
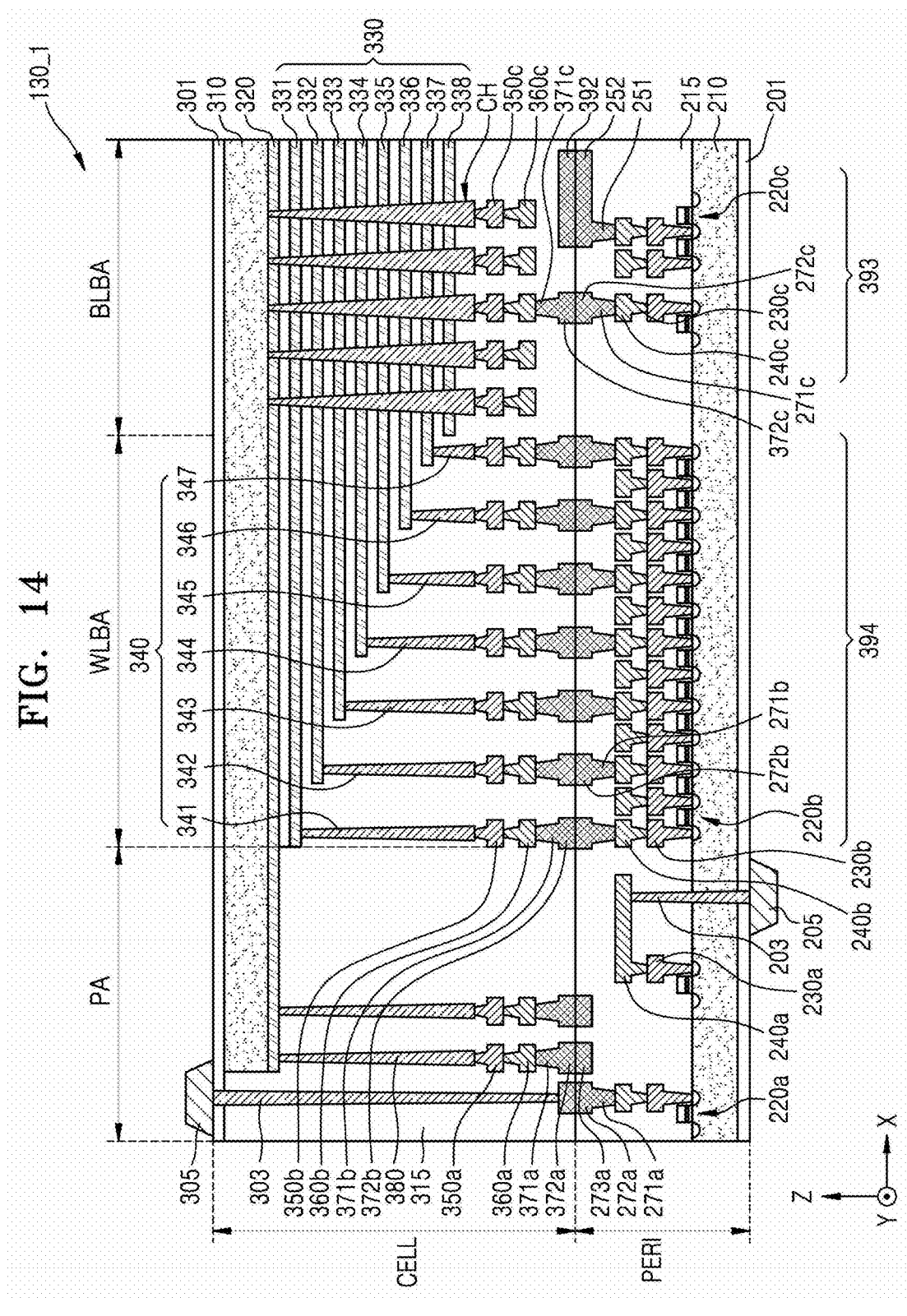

Further referring to FIG. 14, the nonvolatile memory 130_1 may have a chip to chip (C2C) structure. The C2C structure may mean connecting an upper chip and a lower chip to each other by a bonding method after manufacturing the upper chip including the cell region CELL on the first wafer, and manufacturing the lower chip including the peripheral circuit region PERI on a second wafer that is different from a first wafer. For example, the bonding method may refer to a method of electrically connecting the bonding metal formed in the uppermost metal layer of the upper chip and the bonding metal formed in the uppermost metal layer of the lower chip to each other. For example, when the bonding metal is formed of copper (Cu), the bonding method may be a Cu—Cu bonding method, and the bonding metal may also be formed of aluminum (Al) or tungsten (W).

Each of the peripheral circuit region PERI and the cell region CELL of the nonvolatile memory 130_1 may include an external pad bonding region PA, a word line bonding region WLBA, and a bit line bonding region BLBA.

The peripheral circuit region PERI may include a first substrate 210, an interlayer insulating layer 215, a plurality of circuit elements 220a, 220b, and 220c formed on the first substrate 210, a plurality of first metal layers 230a, 230b, and 230c respectively connected to the plurality of circuit elements 220a, 220b, 220c, and a plurality of second metal layers 240a, 240b, and 240c formed on the plurality of first metal layers 230a, 230b, and 230c. In one example embodiment, the first metal layers 230a, 230b, and 230c may be formed of tungsten having a relatively high electrical resistivity and the second metal layers 240a, 240b, and 240c may be formed of copper having a relatively low electrical resistivity.

In this specification, only the first metal layers 230a, 230b, and 230c and the second metal layers 240a, 240b, and 240c are shown and described, but the inventive concept is not limited thereto, and at least one metal layer may be further formed on the second metal layers 240a, 240b, and 240c. At least a portion of the one or more metal layers formed on the second metal layers 240a, 240b, and 240c may be formed of aluminum having a lower electrical resistivity than copper forming the second metal layers 240a, 240b, and 240c.

The interlayer insulating layer 215 is disposed on the first substrate 210 to cover the plurality of circuit elements 220a, 220*b*, and 220*c*, the first metal layers 230*a*, 230*b*, and 230*c*, and the second metal layers 240*a*, 240*b*, and 240*c*, and may include an insulating material such as silicon oxide, silicon nitride, or the like.

Lower bonding metals 271*b* and 272*b* may be formed on the second metal layer 240*b* of the word line bonding region WLBA. In the world line bonding region WLBA, the lower bonding metals 271*b* and 272*b* of the peripheral circuit region PERI may be electrically connected to the upper bonding metals 371*b* and 372*b* of the cell region CELL by a bonding method, and the lower bonding metals 271*b* and 272*b* and the upper bonding metals 371*b* and 372*b* may be formed of aluminum, copper, tungsten, or the like.

The cell region CELL may provide at least one memory block. The cell region CELL may include a second substrate 310 and a common source line 320. A plurality of word lines 331 to 338 (e.g., 330) may be stacked on the second substrate 310 in a direction (Z-axis direction) perpendicular to the upper surface of the second substrate 310. String select lines and ground select lines may be disposed on each of the upper and lower portions of the word lines 330, and the plurality of word lines 330 may be disposed between the string select lines and the ground select line.

In the bit line bonding region BLBA, the channel structure CH may extend in a direction (Z-axis direction) perpendicular to the upper surface of the second substrate 310 to pass through the word lines 330, the string select lines, and the ground select line. The channel structure CH may include a data storage layer, a channel layer, and a buried insulating layer, and the channel layer may be electrically connected to the first metal layer 350*c* and the second metal layer 360*c*. For example, the first metal layer 350*c* may be a bit line contact and the second metal layer 360*c* may be a bit line (and also referred to as bit line). In some example embodiments, the bit line 360*c* may extend in a first direction (Y-axis direction) parallel to the upper surface of the second substrate 310.

A region in which the channel structure CH and the bit line 360*c* are disposed may be defined as a bit line bonding region BLBA. The bit line 360*c* may be electrically connected to circuit elements 220*c* providing the page buffer 393 in the peripheral circuit region PERI in the bit line bonding region BLBA. For example, the bit line 360*c* may be connected to the upper bonding metals 371*c* and 372*c* in the peripheral circuit region PERI, and the upper bonding metals 371*c* and 372*c* may be connected to the lower bonding metals 271*c* and 272*c* connected to the circuit elements 220*c* of the page buffer 393.

In the word line bonding region WLBA, the word lines 330 may extend in a second direction (X-axis direction) perpendicular to the first direction and parallel to the top surface of the second substrate 310, and may be connected to a plurality of cell contact plugs 341 to 347 (e.g., 340). The word lines 330 and the cell contact plugs 340 may be connected to each other by pads provided by extending at least some of the word lines 330 to different lengths in the second direction. A first metal layer 350*b* and a second metal layer 360*b* may be sequentially connected to the upper portions of the cell contact plugs 340 connected to the word lines 330. The cell contact plugs 340 may be connected to a peripheral circuit region PERI through the upper bonding metals 371*b* and 372*b* of the cell region CELL and the lower bonding metals 271*b* and 272*b* of the peripheral circuit region PERI in the word line bonding region WLBA.

The cell contact plugs 340 may be electrically connected to circuit elements 220*b* providing the row decoder 394 in the peripheral circuit region PERI. In one example embodiment, the operating voltages of the circuit elements 220*b* forming the row decoder 394 may be different from the operating voltages of the circuit elements 220*c* forming the page buffer 393. For example, the operating voltages of the circuit elements 220*c* forming the page buffer 393 may be greater than the operating voltages of the circuit elements 220*b* forming the row decoder 394.

A common source line contact plug 380 may be disposed in the outer pad bonding region PA. The common source line contact plug 380 is formed of a conductive material such as a metal, a metal compound, or polysilicon, and may be electrically connected to the common source line 320. A first metal layer 350*a* and a second metal layer 360*a* may be sequentially stacked on the common source line contact plug 380. For example, a region where the common source line contact plug 380, the first metal layer 350*a*, and the second metal layer 360*a* are disposed may be defined as an external pad bonding region PA.

In addition, input/output pads 205 and 305 (also referred to as first input/output pads) may be disposed in the outer pad bonding region PA. A lower insulating film 201 covering a lower surface of the first substrate 210 may be formed under the first substrate 210, and the first input/output pad 205 may be formed on the lower insulating film 201. The first input/output pad 205 may be connected to at least one of a plurality of circuit elements 220*a*, 220*b*, and 220*c* arranged in a peripheral circuit region PERI through a first input/output contact plug 203 and may be separated from the first substrate 210 by the lower insulating film 201. In addition, a side insulating film may be disposed between the first input/output contact plug 203 and the first substrate 210 to electrically separate the first input/output contact plug 203 from the first substrate 210.

An upper insulating film 301 covering the upper surface of the second substrate 310 may be formed on the second substrate 310, and a second input/output pad 305 may be disposed on the upper insulating film 301. The second input/output pad 305 may be connected to at least one of the plurality of circuit elements 220*a*, 220*b*, and 220*c* disposed in the peripheral circuit region PERI through the second input/output contact plug 303. In one embodiment, the second input/output pad 305 may be electrically connected to the circuit element 220*a* through PA lower metal pattern 272*a* and PA lower metal contact 271*a*.

According to some example embodiments, the second substrate 310 and the common source line 320 may not be disposed in a region where the second input/output contact plug 303 is disposed. Also, the second I/O pad 305 may not overlap the word lines 330 in the third direction (Z-axis direction). The second input/output contact plug 303 may be separated from the second substrate 310 in a direction parallel to the upper surface of the second substrate 310 and may be connected to the second input/output pad 305 through the interlayer insulating layer 315 of the cell region CELL.

According to some example embodiments, the first input/output pad 205 and the second input/output pad 305 may be selectively formed. For example, the nonvolatile memory 130_1 may include only the first input/output pad 205 disposed on the first substrate 210, or include only the second input/output pad 305 disposed on the second substrate 310. Alternatively, the nonvolatile memory 130_1 may include both the first input/output pad 205 and the second input/output pad 305.

In each of the outer pad bonding region PA and the bit line bonding region BLBA respectively included in the cell region CELL and the peripheral circuit region PERI, the metal pattern of the uppermost metal layer may exist as a dummy pattern, or the uppermost metal layer may be empty.

In relation to the nonvolatile memory 130_1, corresponding to the upper metal pattern 372a formed on the uppermost metal layer of the cell region CELL, a lower metal pattern 273a having the same shape as the upper metal pattern 372a of the cell region CELL may be formed on the uppermost metal layer of the peripheral circuit region PERI in the outer pad bonding region PA. The lower metal pattern 273a formed on the uppermost metal layer of the peripheral circuit region PERI may not be connected to a separate contact in the peripheral circuit region PERI. Similarly, corresponding to the lower metal pattern 273a formed on the uppermost metal layer of the peripheral circuit region PERI in the external pad bonding region PA, an upper metal pattern 372a having the same shape as the lower metal pattern 273a of the peripheral circuit region PERI may be formed on the upper metal layer of the cell region CELL. The upper metal pattern 372a may be connected to the second metal layer 360a through an upper metal pattern contact 371a.

Lower bonding metals 271b and 272b may be formed on the second metal layer 240b of the word line bonding region WLBA. In the word line bonding region WLBA, the lower bonding metals 271b and 272b of the peripheral circuit region PERI may be electrically connected to the upper bonding metals 371b and 372b of the cell region CELL by a bonding method.

Also, in the bit line bonding region BLBA, corresponding to the BLBA lower metal pattern 252 formed on the uppermost metal layer of the peripheral circuit region PERI, an upper metal pattern 392 having the same shape as the BLBA lower metal pattern 252 of the peripheral circuit region PERI may be formed on the uppermost metal layer of the cell region CELL. The BLBA lower metal pattern 252 may be connected to the uppermost metal layer of the peripheral circuit region PERI by a metal pattern contact 251. A contact may not be formed on the upper metal pattern 392 formed on the uppermost metal layer of the cell region CELL.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A memory device comprising:
  a plurality of memory blocks, each memory block of the plurality of memory blocks including
    a first subblock configured to store first data in triple level cell (TLC) units or quad level cell (QLC) units; and
    a second subblock configured to perform an erase operation independently of the first subblock and store second data in units of single level cells (SLCs), wherein each memory block comprises a first memory stack and a second memory stack that are connected between a common source line and a plurality of bit lines and the first memory stack and the second memory stack are vertically stacked, and wherein the first subblock corresponds to the first memory stack, and the second subblock corresponds to the second memory stack, and
  wherein, in response to receiving a write operation performing request from a host device, the write operation performing request corresponding to the first data, the memory device is configured to perform a first write operation on the second subblock of a first memory block, the first write operation writing the second data into the second subblock of the first memory block, and in response to the first write operation being performed, the memory device is configured to perform a first read operation on the second data in the second subblock of the first memory block, and
  wherein the memory device is configured to perform a second write operation on the first subblock of a selected memory block of the plurality of memory blocks in response to the first read operation being performed on the second data in the second subblock of the first memory block, the second write operation writing the first data into the first subblock of the selected memory block, and
  wherein the memory device is configured to store meta data in the second subblock of a second memory block.

2. The memory device of claim 1, wherein the second subblock of the first memory block includes a data buffer region.

3. The memory device of claim 1, wherein the selected memory block is the first memory block, and wherein the second write operation is performed on the first subblock of the first memory block.

4. The memory device of claim 3, wherein the memory device is configured to perform the erase operation on the second subblock of the first memory block in response to the second write operation being performed.

5. The memory device of claim 1, wherein the selected memory block is the second memory block, and wherein the second write operation is performed on the first subblock of the second memory block.

6. The memory device of claim 5, wherein the memory device is configured to perform the erase operation on the second subblock of the first memory block in response to the second write operation being performed.

7. The memory device of claim 1, wherein the memory device is configured to use the second subblock of the first memory block as a data buffer region for data to be stored in the first subblock of the selected memory block, and to use the second subblock of the second memory block as a meta region in which the meta data is stored.

8. The memory device of claim 1, wherein the second subblock of the second memory block includes a meta region.

9. A method of operating a memory device including a plurality of memory blocks, each memory block of the plurality of memory blocks including a first subblock and a second subblock, the plurality of memory blocks including a first memory block and a second memory block, the method comprising:
  in response to receiving a write operation performing request corresponding to a first data, performing a first write operation on the second subblock of the first memory block, the first write operation writing second data into the second subblock of the first memory block;

in response to the first write operation being performed, performing a first read operation on the second data in the second subblock of the first memory block;

in response to the first read operation being performed on the second data in the second subblock of the first memory block, performing a second write operation on the first subblock of a selected memory block of the plurality of memory blocks, the second write operation writing the first data into the first subblock of the selected memory block; and storing meta data in the second subblock of the second memory block, wherein the first subblock stores the first data in triple level cell (TLC) or quad level cell (QLC) units, and the second subblock stores the second data in units of single level cells (SLCs) and performs an erase operation independently of the first subblock, and wherein each memory block comprises a first memory stack and a second memory stack connected between a common source line and a plurality of bit lines and the first memory stack and the second memory stack are vertically stacked, the first subblock corresponding to the first memory stack and the second subblock corresponding to the second memory stack.

10. The method of claim 9, wherein the selected memory block is the first memory block, and wherein the second write operation is performed on the first subblock of the first memory block.

11. The method of claim 10, further comprising:

performing the erase operation on the second subblock of the first memory block in response to performing the second write operation.

12. The method of claim 9, wherein the selected memory block is the second memory block, and wherein the second write operation is performed on the first subblock of the second memory block.

13. The method of claim 12, further comprising:

performing the erase operation on the second subblock of the first memory block in response to performing the second write operation.

14. The method of claim 9, wherein the second subblock of the second memory block includes a meta region.

15. The method of claim 9, wherein the second subblock of the first memory block includes a data buffer region.

16. A memory system comprising:

a memory device including a plurality of memory blocks; and a host controlling the memory device, wherein each memory block of the plurality of memory blocks includes, a first subblock configured to store first data in triple level cell (TLC) or quad level cell (QLC) units, and a second subblock configured to perform an erase operation independently of the first subblock and store second data in units of single level cells (SLCs), wherein each memory block comprises a first memory stack and a second memory stack that are connected between a common source line and a plurality of bit lines and the first memory stack and the second memory stack are vertically stacked, and wherein the first subblock corresponds to the first memory stack, and the second subblock corresponds to the second memory stack, wherein the plurality of memory blocks includes a first memory block and a second memory block, wherein the host is configured to control the memory device such that in response to the memory device receiving a write operation performing request from the host, the write operation performing request corresponding to the first data, the memory device is configured to perform a first write operation on the second subblock of the first memory block, the first write operation writing the second data into the second subblock of the first memory block, and in response to the first write operation, the memory device is configured to perform a first read operation on the second data in the second subblock of the first memory block, wherein in response to the first read operation being performed on the second data in the second subblock of the first memory block, the memory device is configured to perform a second write operation on the first subblock of a selected memory block of the plurality of memory blocks, the second write operation writing the first data into the first subblock of the first memory block, and wherein the memory device is configured to store meta data in the second subblock of the second memory block.

17. The memory system of claim 16, wherein the second subblock of the first memory block includes a data buffer region.

18. The memory system of claim 16, wherein the selected memory block is the first memory block, and wherein the second write operation is performed on the first subblock of the first memory block.

19. The memory system of claim 16, wherein the selected memory block is the second memory block, and wherein the second write operation is performed on the first subblock of the second memory block.

20. The memory system of claim 16, wherein the second subblock of the second memory block includes a meta region.

* * * * *